(12) United States Patent
Kuo et al.

(10) Patent No.: US 6,473,259 B1
(45) Date of Patent: Oct. 29, 2002

(54) DISK HEAD HEIGHT CONTROL

(75) Inventors: David S. Kuo, Palo Alto, CA (US); Wei H. Yao, Fremont, CA (US); Ramesh Sundaram, Fremont, CA (US); Huan Tang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/405,832

(22) Filed: Sep. 24, 1999

(51) Int. Cl.$^7$ ............................................... G11B 21/02
(52) U.S. Cl. ...................... 360/75; 360/294.7
(58) Field of Search ............................ 360/245.3–245.7, 360/246.4, 246.7, 264.5, 75, 78.05, 78.12, 294.7, 77.16, 77.02, 234.7, 294.1, 294.2, 294.3, 294.5, 294.6

(56) References Cited

U.S. PATENT DOCUMENTS

| | | | |
|---|---|---|---|
| 3,863,124 A | 1/1975 | Pierce et al. .................. 318/638 |
| 4,605,977 A | 8/1986 | Matthews ..................... 360/103 |
| 4,814,907 A | 3/1989 | Goor ............................. 360/75 |
| 4,954,904 A * | 9/1990 | Goor ......................... 360/294.7 |
| 5,031,055 A * | 7/1991 | Yanagisawa ................... 360/75 |
| 5,060,099 A | 10/1991 | Yaeger et al. ................ 360/105 |
| 5,153,785 A * | 10/1992 | Muranushi et al. ............ 360/75 |
| 5,255,135 A | 10/1993 | Itoh et al. ...................... 360/75 |
| 5,325,244 A * | 6/1994 | Takano et al. ........ 360/78.05 X |
| 5,377,058 A | 12/1994 | Good et al. .................... 360/75 |
| 5,729,399 A * | 3/1998 | Albrecht et al. ............... 360/75 |
| 5,745,319 A * | 4/1998 | Takekado et al. ........ 360/78.05 |
| 5,764,432 A | 6/1998 | Kasahara ...................... 360/75 |
| 5,793,571 A | 8/1998 | Jurgenson et al. .......... 360/104 |
| 5,834,864 A * | 11/1998 | Hestermen et al. .. 360/78.05 X |
| 5,898,541 A | 4/1999 | Boutaghou et al. ......... 360/109 |
| 5,943,761 A | 8/1999 | Tucker et al. ............. 29/603.03 |
| 6,178,157 B1 * | 1/2001 | Berg et al. .......... 360/294.7 X |

FOREIGN PATENT DOCUMENTS

| | | | | |
|---|---|---|---|---|
| JP | 540038107 | * | 3/1979 | ............... 360/75 C |
| JP | 404095284 | * | 3/1992 | ............... 360/75 C |
| JP | 404205867 | * | 7/1992 | ............... 360/75 C |

* cited by examiner

*Primary Examiner*—David Hudspeth
*Assistant Examiner*—K. Wong

(57) ABSTRACT

A disk head fly height adjustment method includes positioning a disk head over a surface of a rotating data storage disk and dynamically altering a load point of the disk head by changing an electrical force applied to an active element mounted to a head-gimbal assembly. A data storage apparatus includes a head assembly having a data transfer head coupled to a gimbal and an active element coupling the head assembly and a suspension. The active element is configured to exert a force between the head assembly and the suspension in response to an electrical force applied to the active element. The active element can dynamically shift a load point of a disk head. Shifting the load point can alter the pitch of the disk head and, consequently, the fly height of the head.

20 Claims, 4 Drawing Sheets

DISK HEAD HEIGHT CONTROL

BACKGROUND

Disk drives are information storage devices that use thin film magnetic media to store data. A typical disk drive includes one or more rotating disk having concentric data tracks wherein data is read or written. As the disk rotates, a transducer (or "head") is positioned by an actuator to magnetically read data from or write data to the various tracks on the disk. When the disk is rotating at operating speeds, pressure effects caused by air flow between the surface of the disk and an air bearing surface of the head cause the head to float above the disk. Once a predetermined rotational speed and head fly height (i.e. float height) is reached, reading and/or writing of data may commence. Maintaining proper fly height is essential to the accurate and reliable operation of the disk drive.

SUMMARY

A disk head loading force adjustment mechanism that can be used to dynamically shift a load point of a disk head. Shifting the load point can alter the pitch of the disk head and, consequently, the fly height of the head. This allows for active head fly height control and can provide advantages such as better mechanical integrity of a magnetic hard disk drive. A drive may be constructed such that the head flies higher in the landing zone and flies lower in the data zone. This can help minimize magnetic spacing loss in a disk's data zone and may permit higher areal densities to be achieved. In addition, the active control of the load point can help reduce head fly height differences between different heads in a drive or in different drives, thereby providing for more consisting head operation across manufactured drives.

In general, in one aspect, the invention features a disk head fly height adjustment method. The method includes positioning a disk head over a surface of a rotating data storage disk and dynamically altering a load point of the disk head by changing an electrical force applied to an active element mounted to a gimbal assembly.

In general, in another aspect, the invention features a data storage apparatus that includes a head assembly having a data transfer head coupled to a gimbal and an active element coupling the head assembly and a suspension. The active element is configured to exert a force between the head assembly and the suspension in response to an electrical force applied to the active element.

Implementations may include one or more of the following features. The invention may be used with disk media having a magnetically alterable surface having a data zone and a landing zone. Other disk media types also may be used. Positioning control circuitry may change the fly height of an air bearing disk head depending on whether the disk head is positioned over the landing zone or the data zone. The loading force may be dynamically altered in response to a signal from the disk head, such as a data read strength signal. Changing the loading force may be done by changing an electrical force (such as a current or a voltage) applied to an active element mounted to, or formed as part of, a head-gimbal assembly. Altering the load point may alter a pitch angle of the disk head. The active element may be a solenoid that may have a core coupled to the gimbal assembly and a magnetically active element coupled to the suspension. Other active elements, such as piezo-electric elements, also may be used. Apparatus embodying the invention also may include a disk coupled to a disk rotating motor and an actuator coupled to a suspension and configured to position the head assembly over a surface of the disk media.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
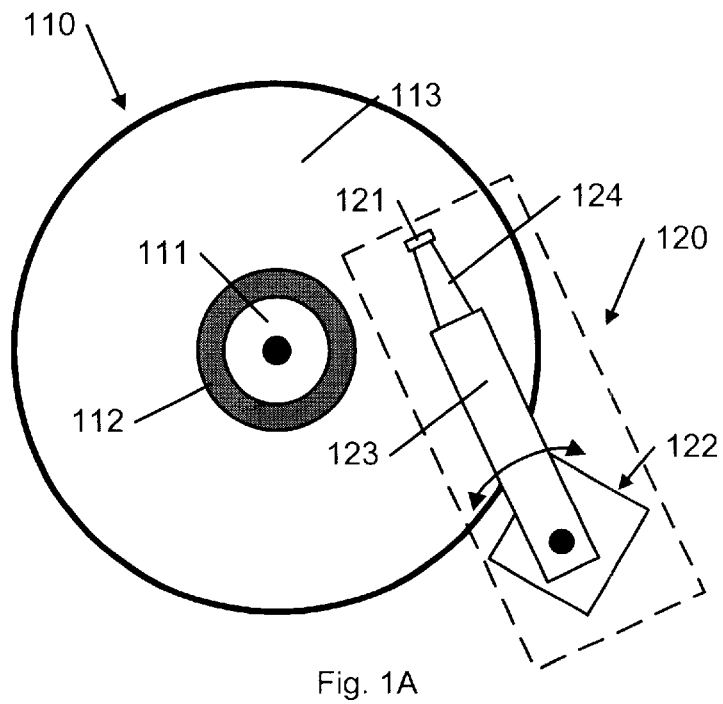
FIGS. 1A and 1B are top view diagrams of a disk drive.
Figure 1B:
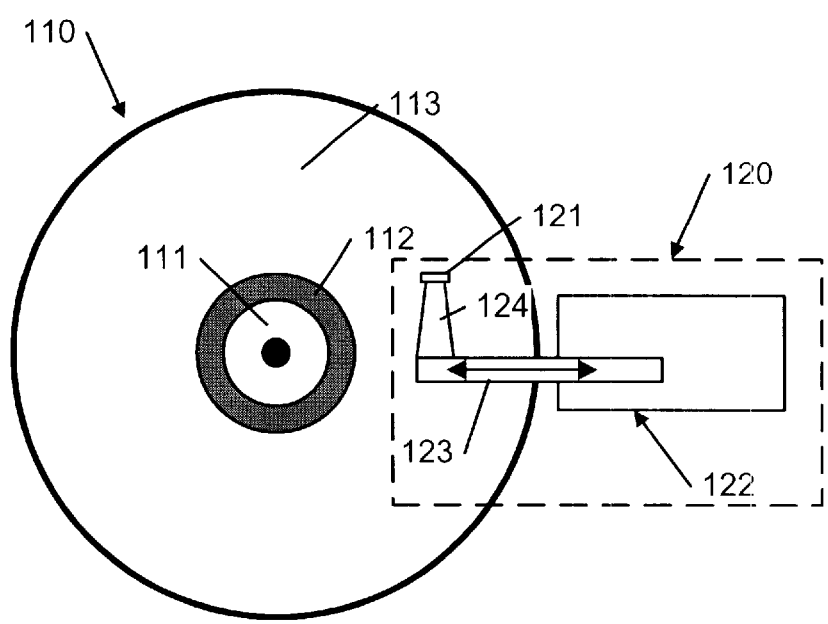
Figure 2:
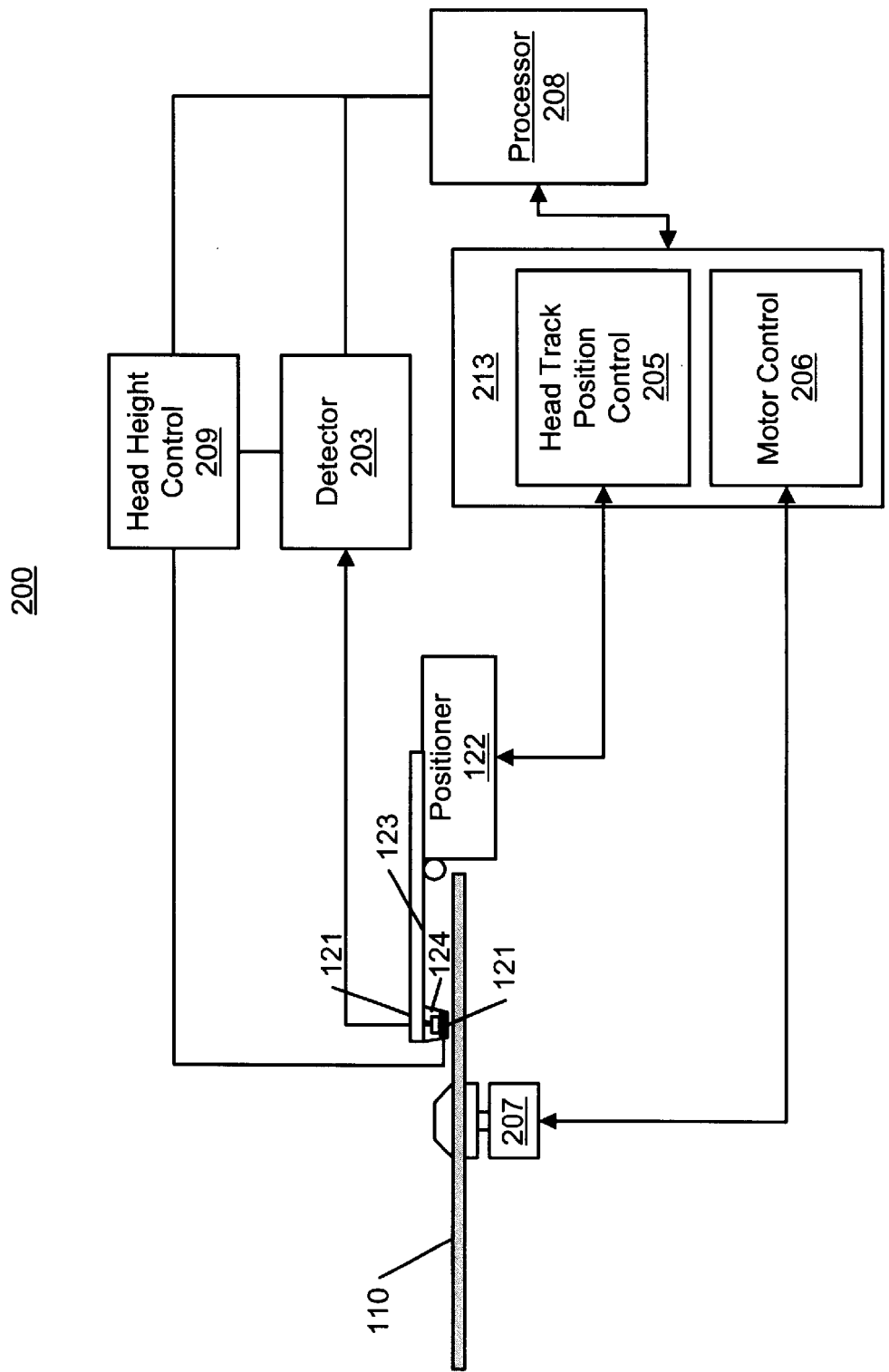
FIG. 2 is a side-view diagram of a disk drive.

FIGS. 1A and 1B each show a top view of a magnetic disk 110 and a disk head assembly 120 for use in a disk drive. FIG. 2 shows a side view of a disk, disk head assembly, and other disk drive components. In FIG. 1A, the assembly 120 includes a rotary head positioning actuator 122 that moves arm 123 and attached head gimbal assembly (HGA) 124. Typically, the HGA section 124 is rigidly attached to the arm 123 by a swaging operation. The HGA includes a magnetic transducer or head 121 which is mounted to an air bearing slider that is attached to a suspension (also known as a flexure) by means of a gimbal type mounting. Typically, the head 121 is biased toward the magnetic surface of a disk by a predetermined bend in the suspension. In FIG. 1B the assembly 120 includes a linear head positioning actuator 122 instead of the rotary actuator of FIG. 1A.

A typical disk 110 is formed on an NiP coated aluminum alloy or glass substrate to which various coatings are sequentially applied. Typical coatings include an underlayer of chromium or a chromium alloy, a magnetic layer of cobalt or a cobalt-based alloy, a corrosion protective carbon overcoat, and a lubricant topcoat. A disk 110 may include a center portion 111 where the disk can be attached to a drive motor 207 spindle, a landing zone 112, and a data zone 113. The data zone 113 includes numerous closely spaced concentric tracks where data can be stored. During operation, disk 110 is rotated by the motor 207 at speeds regulated by the motor controller 206 under command from processor 208. The rotation of disk 110 results in pressure effects causing air-bearing disk head 121 to float above the surface of the disk 110 at a height ($\delta$). As the head 121 floats above the rotating disk 110, the positioner 122, under control of the processor 208 and control circuitry 205, moves the head over the disk's data zone 113. Data can then be read from or written to those tracks by the head 121.

The fly height ($\delta$) of disk head 121 is an important parameter affecting, among other things, the density of data that can be read from and written to disk 110, the read and write accuracy of the disk drive, and the reliability and longevity of the drive. The fly height ($\delta$) is affected by the air-bearing design of the head and its attachment to its supporting head gimbal assembly, as well as the linear velocity of the rotating disk 110.

Figure 3A:
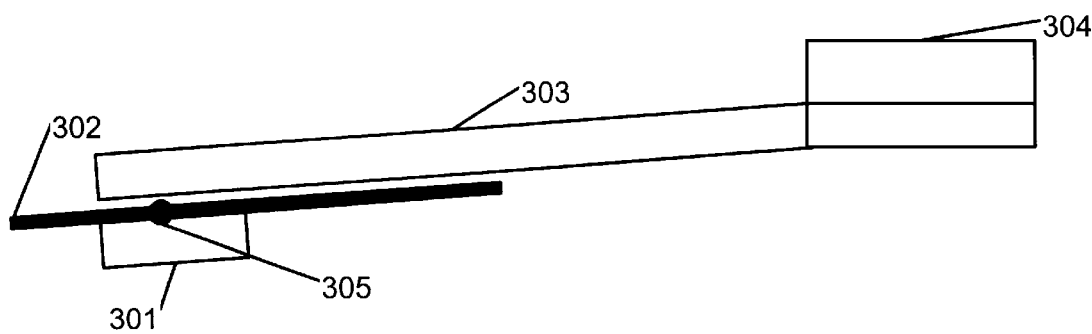
FIG. 3A is a side view of a head gimbal assembly.

A head-gimbal-assembly (HGA) 124 is shown in more detail in FIG. 3A. The head-gimbal-assembly 300 consists of a head 301, a gimbal 302, a suspension 303, and a swage plate 304. Head 301 corresponds to the head 121 of FIGS.

1A, 1B and 2. The head 301 is typically epoxied to the gimbal 302 and the gimbal assembly is spot welded to the suspension 303. Swage plate 304 is a rigid attachment point at which the head-gimbal-assembly is attach to arm 123. The attachment point between the head 301 and gimbal-suspension assembly 302 may be defined by a dimple 305 that can be formed in the gimbal or in the suspension. During disk operation, when bead 301 is loaded (e.g., positioned) over a rotating disk surface, a loading force is applied to the head 301 by the suspension 303. The loading force applied to the head 301 will depend on the amount of deflection and the elastic modulus of the suspension 303 as well as the lift of the head due to air pressure effects causing head flotation.

Figure 3B:
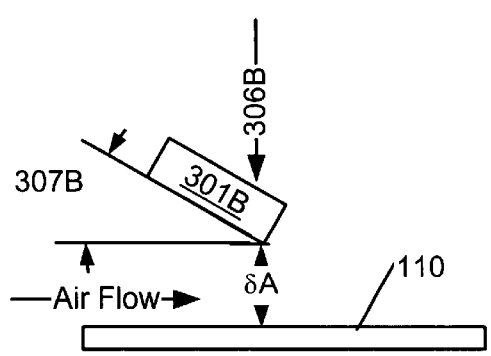
FIGS. 3B and 3C are disk head detail diagrams.
Figure 3C:
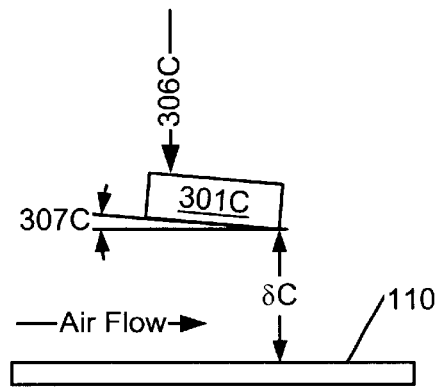

The loading force applied to the head 301, and the effective point at which it is applied, change the air bearing properties of the head and will thereby affect the flying height ($\delta$) of the head. FIGS. 3B and 3C illustrate disk heads 301B and 301C in which the loading force is applied at different load points 306B and 306C. The load points 306B and 306C may be determined by the position of dimple 305 and/or by the region in which a head is attached to a head-gimbal-assembly. FIG. 3B shows a head loading force applied at load point 306B that is at the right-hand side of the head 301B. The loading force applied at load point 306B affects the position of head 301B such that an angle 307B is formed between the head 301B and a plane parallel to a surface of disk 110. The angle 307B affects the air bearing characteristics of the head 301B resulting in a flying height of 6B. In FIG. 3C, the load point 306C is shifted toward the left-hand side of on the head 301C with respect to load point 306B on head 301B. As a result, the angle 307C between head 301C and a plane parallel to the surface of disk 110 is reduced compared to the angle 307B, and the height $\delta C$ of the head 301C is increased with respect to height $\delta B$.

Figure 4A:
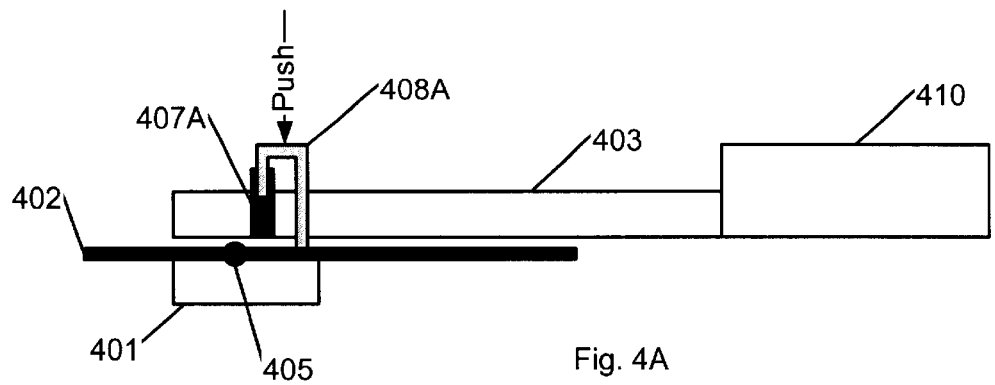
FIGS. 4A and 4B are side-view diagrams of head gimbal assemblies with active elements.
Figure 4B:
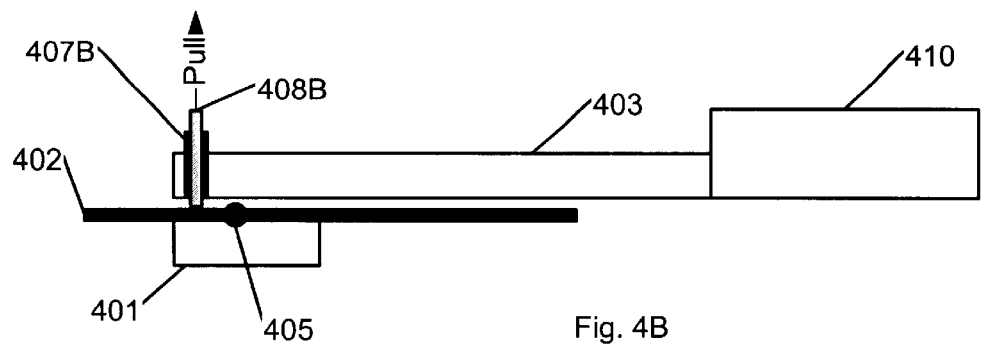

As shown by FIGS. 3B and 3C, changing the loading forces on a disk head affects the flying height of the head. According to the invention, a disk drive may incorporate an active element to dynamically vary the height of a disk head. FIGS. 4A and 4B show different implementations of head-gimbal-assemblies (HGAs) 400 and 450 in which the effective load point of a disk head can be dynamically varied. In the HGAs, 400 and 450 the flying height of a disk head 401 is dynamically varied by varying loading forces applied to the bead (or to a head mounting surface such as gimbal 502).

Figure 4C:
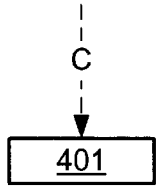
FIGS. 4C and 4D are disk head load force diagrams.
Figure 4D:
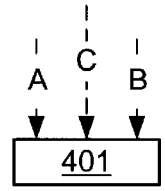

Referring to FIG. 4A, to dynamically vary loading forces applied to a disk head 401, an active element, such as solenoid 407A is used to apply a dynamically adjustable force to the head or a head mounting surface. In HGA 400, this dynamically adjustable force is provided by a solenoid 407A that is attached to the suspension 403 and used to exert force on coupling member 408A. The coupling member 408A may be a movable core of the solenoid 407A and may be made of a permanent magnet or other high permeability material. When the solenoid 407A is energized, the coupling member 408A exerts a force on the gimbal 402 at an attachment point that is to the right of dimple 405 (that is, at a point between dimple 405 and swage plate 410). The force exerted by the coupling member 408A changes the loading forces applied to the head 401. FIGS. 4C and 4D illustrates dynamic changes to head loading forces that can be achieved using the HGA 400. In FIG. 4C, the solenoid 407A is inactive and a default loading force 'C' is applied to the head 401 through the dimple 405. In FIG. 4D, the solenoid 407A is energized causing the coupling element 408A to move in a downward direction and to exert a push force 'B' at the coupling element's point of attachment to the head or gimbal assembly. The combination of the default loading force at load point 'C' and the loading force from active coupling element 408A at point 'B' changes the loading forces on the head 401. In FIG. 4D, the combination of loading forces 'C' and 'B' change the air-bearing properties of the head 401 and, therefore, the flying height of the head 401. For example, depending on the magnitude and direction of the force 'B' applied by the coupling element 408A, the effective loading point of the head may be shifted from the default point 'C' to a new point 'A'.

In general, the magnitude of the force that is applied by the solenoid can be calculated using the formula:

$$F = -\mu_0(-1)n^2 I^2 A/(2L^2)$$

where:

F is the magnitude of the force, $\mu_0$ is the permeability of a vacuum, is the relative permeability of the solenoid's core, n is the number of turns of the solenoid, I is the applied current, A is the cross-sectional area of the solenoid core and L is the length of the solenoid.

Using the above formula, a force of 30 mN (or 3 milligrams) is calculated for an exemplary solenoid with n=10, I=30 mA, A=0.04 mm$^2$, L=0.1 mm, and a core of supermalloy=10$^6$.

FIG. 4B shows another implementation of a HGA with a active element configured to exert force on a head-gimbal assembly. In the implementation 450, the active element 407B is positioned at the end of the suspension 403 and the coupling element 408B is attached to the head-gimbal assembly at a point to the left of dimple 405 (that is, at a far-end of suspension 403 away from the swage plate 410). In HGA 450, the active element 407B can be used to exert a pull force on the head-gimbal assembly thereby shifting the effective load point.

Implementations may use a different active element used to dynamically exert a force on the gimbal assembly. For example, implementations may use a sandwich of electrically deformable piezo-electric material placed between the suspension 403 and gimbal 402 rather than the solenoids depicted in FIGS. 4A and 4B. Furthermore, although varying of disk head load point by applying a force between suspension 403 and 402 was shown, in some implementations, a force may be applied between the gimbal 402 and head 401 to vary the load point.

Referring back to FIG. 2, a disk drive may contain height control circuitry 209 to control the force exerted by the active head height control element 407A and 407B and, thereby, to control the disk head height. The control circuitry 209 may adjust the height based on the strength of a disk head's read signal. The read signal may be supplied to a detector 203 which may work in conjunction with a processor 208 to regulate the height of the disk head. The head height positioning feedback from detector 203 may be based on the average or instantaneous read signal strength from the head 201 or other properties. In some implementations, dynamic loading force changes may be varied to adjust the height of the head based on the head's position or motor 207 speed. For example, loading forces may be adjusted to give the head greater lift (that is, to increase head height) at low motor speeds or when the head is over a landing zone 112 on the disk.

A number of embodiments of the present invention have been described. Nevertheless, it will be understood that various modifications may be made without departing from the spirit and scope of the invention. For example, a microactuator built on the suspension that can apply or unload force to the head at various location may be used. Accordingly, other embodiments are within the scope of the following claims.

What is claimed is:

1. A disk head fly height adjustment method comprising:

positioning a disk head over a surface of a rotating data storage disk, the head being coupled to a mounting surface and positioned by movement of an assembly comprising a suspension coupled to the mounting surface; and dynamically altering the disk head fly height by altering a load point of the disk head using an active element to change a force applied between the suspension and the mounting surface.

2. The method of claim 1 wherein:

the surface comprises a landing zone and a data zone;

dynamically altering comprises altering the load point to increase a disk head fly height when the disk head is positioned over the landing zone and altering the load point to reduce the disk head fly height when the disk head is positioned over the data zone.

3. The method of claim 1 wherein dynamically altering comprises altering in response to a signal from the disk head.

4. The method of claim 3 wherein the signal from the disk head comprises a data signal.

5. The method of claim 1 wherein the mounting surface comprises a gimbal.

6. The method of claim 1 wherein dynamically altering a load point comprises altering a pitch angle of the disk head.

7. The method of claim 1 wherein:

positioning a disk head comprises altering an actuator position to change a position of the suspension coupled to the gimbal assembly.

8. The method of claim 1 wherein the active element comprises a solenoid and wherein dynamically altering comprises altering the electrical force applied to the solenoid to change the force applied between the suspension and the mounting surface.

9. The method of claim 8 wherein the solenoid comprises a core coupled to the gimbal assembly and a magnetically active element coupled to the suspension.

10. The method of claim 1 wherein the active element comprises a piezo-electric element.

11. The method of claim 1 wherein the force altering the load point is applied in a direction substantially orthogonal to the disk surface.

12. A data storage apparatus comprising:

a head assembly comprising a suspension coupled to a mounting surface coupled to a slider comprising a data transfer head; and an active element coupling the mounting surface and the suspension and configured to exert a force between the mounting surface and the suspension to alter a load point affecting fly height of the head in response to an electrical force applied to the active element.

13. The apparatus of claim 12 wherein the active element comprises an element configured to alter a pitch angle of the slider.

14. The apparatus of claim 12 further comprising:

control circuitry coupled to the active element and configured to alter the electrical force in response to a signal from the data transfer head.

15. The apparatus of claim 12 further comprising:

a disk media coupled to a disk media rotating motor; and an actuator coupled to the suspension and configured to position the head assembly over a surface of the disk media.

16. The apparatus of claim 15 wherein the disk media comprises a data zone and a landing zone and the apparatus further comprises positioning control circuitry operatively coupled to the active element and to the actuator, the positioning control circuitry being configured to selectively control positions of the head assembly over the data zone and landing zone and to alter the electrical force to increase a fly height of the data transfer head when the data transfer head is positioned over the landing zone and to decrease the fly height of the data transfer head when the data transfer head is positioned over the data zone.

17. The apparatus of claim 15 wherein the disk media comprises a magnetically alterable surface for storing data.

18. The apparatus of claim 15 wherein the slider comprises an air bearing surface.

19. The apparatus of claim 12 wherein the active element comprises a solenoid.

20. A disk drive apparatus comprising:

an actuator configured to position a head-gimbal assembly comprising a suspension coupled to a mounting surface coupled to a data transfer head over a surface of a magnetic data storage disk; and head-gimbal assembly means for dynamically changing a force applied between the mounting surface and the suspension to actively change a data transfer head loading force to dynamically change a fly height of the data transfer head.

* * * * *